United States Patent [19]

Hirooka et al.

[11] Patent Number: 5,782,098
[45] Date of Patent: Jul. 21, 1998

[54] FREEZER CONTROL UNIT

[75] Inventors: Koichi Hirooka; Isao Koga, both of Kanagawa-ken, Japan

[73] Assignees: Kabushiki Kaisha Toshiba; Toshiba Engineering Corporation, both of Kawasaki, Japan

[21] Appl. No.: 802,535

[22] Filed: Feb. 18, 1997

[30] Foreign Application Priority Data

Feb. 27, 1996 [JP] Japan ................... 8-039838

[51] Int. Cl.[6] ................................ F25B 49/02
[52] U.S. Cl. ................... 62/126; 62/158; 62/193; 62/230
[58] Field of Search ................. 62/126, 125, 127, 62/129, 157, 158, 231, 193, 192, 230; 165/270

[56] References Cited

U.S. PATENT DOCUMENTS 4,614,089 9/1986 Dorsey .................... 62/158
4,749,881 6/1988 Uhrich ................... 62/158 X
5,216,897 6/1993 Tsuchiyama ............. 62/230 X

FOREIGN PATENT DOCUMENTS 4-257674 9/1992 Japan .

*Primary Examiner*—Harry B. Tanner
*Attorney, Agent, or Firm*—Oblon, Spivak, McClelland, Maier & Neustadt, P.C.

[57] ABSTRACT

To exercise control so that, when power is restored in the case of there having been a prower cut, the motor does not run simultaneously with other devices which reqire large amounts of power when starting to run. This invention there is provided improved freezer control unit, which exercise to ccntrol by providing power cut detector 10, which detects that the power source which drives freezer 5 has undergone a power cut, and stopping the signal of signal holding circuit 4, which outputs the 'Run' signal, by the signal of this power cut detector 10 when a power cut occurs so that freezer 5 does not restart automatically when power is restored.

5 Claims, 9 Drawing Sheets

FREEZER CONTROL UNIT

BACKGROUND OF THE INVENTION

1. Field of the Invention

This invention concerns freezer control units which control the running of freezers.

2. Description of the Related Art

An example of a prior art freezer control unit is shown in the block diagram FIG. 7. As shown In FIG. 7, freezer control unit 1 has run switch 2 which operates when running starts. The running and stopping of freezer 5 is controlled by the holding of the 'Run' signal by signal holding circuit 4 until a 'Stop' signal is inputted by operating stop switch 3, even if a 'Run' signal is not outputted from this run switch 2.

Also, In the running of freezer 5, there is a requirement for freezer drive motor 6 that it should run after lubricating oil pump 7 has run for a specified time. The 'Run' instruction for this motor 6 is outputted from timer 8 after a specified time delay in the 'Run' signal of signal holding circuit 4.

Furthermore, freezer control unit 1 has freezer protection circuit 9. This freezer protection circuit 9 cuts off the 'Run' signal to motor 6 and lubricating oil pump 7 when freezer 5 has broken down. It also exercises control so that starting is in the order lubricating oil pump 7 then motor 6 when restarted after repair of a breakdown.

The details of the signal processing of each of the above circuits is shown in FIG. 8 (A)–(C).

However, because a large amount of power is when starting motor 6, the running of freezer 5 is operated so that it will not be simultaneous with that of other devices which require large amounts of power.

However, with the prior art freezer control unit 1, in the case of freezer 5 stopping during a power cut, the 'Run' signal is held in signal holding circuit 4 and, after the restoration of power, motor 6 will restart after the set time of timer 8. Thus there was the problem that the running of this motor 6 might start simultaneously with other devices which required large amounts of power, and therefore this might result in over-currents or voltage reductions in the power source system.

SUMMARY OF THE INVENTION

This invention has been designed taking account of the above circumstances. It is an object to provide a freezer control unit which exercises control so that, after repair of a power cut, the motor will not restart simultaneously with other devices which require large amounts of power during its starting.

According to this invention there is provided to in a freezer control unit provided with a run switch and a stop switch which operate running and stopping of the freezer;

- a signal holding circuit which holds the 'Run' signal of this run switch;
- a timer which receives the 'Run' signal held by this signal holding circuit and starts the freezer drive motor by delaying it for a specified time after the freezer lubricating oil pump; and
- a freezer protection circuit which cuts the 'Run' signal, which is the output of the said signal holding circuit, when the freezer has broken down,
- a freezer control unit which has the characteristic of being provided with a power cut detector which detects cuts in the power source of the said freezer; and
- an OR signal circuit which outputs a signal which stops the 'Run' signal of the said signal holding circuit at least one of this power cut detection signal and the stop signal of the said stop switch is established.

According to another invention there is provided to in a freezer control unit provided with a run switch and a stop switch which operate running and stopping of the freezer;

- a signal holding circuit which holds the 'Run' signal of this run switch;
- a timer which receives the 'Run' signal held by this signal holding circuit and starts the freezer drive motor by delay it for a specified time after the freezer lubricating oil pump; and
- a freezer protection circuit which cuts the 'Run' signal, which is the output of the said signal holding circuit, when the freezer has broken down, a freezer control unit which has the characteristic of being provided with a power cut detector which detects cuts in the power source of the said freezer;
- another timer which receives the output signal of this power cut detector and outputs a signal which permits rerunning of the said freezer a specified time after the power has been restored; and
- an AND signal circuit which outputs a 'Run' signal to the said freezer when both the output signal of this timer and the output signal of the said signal holding circuit have been established.

DETAILED DESCRIPTION OF THE PREFERRED EMBODIMENTS

Figure 1:
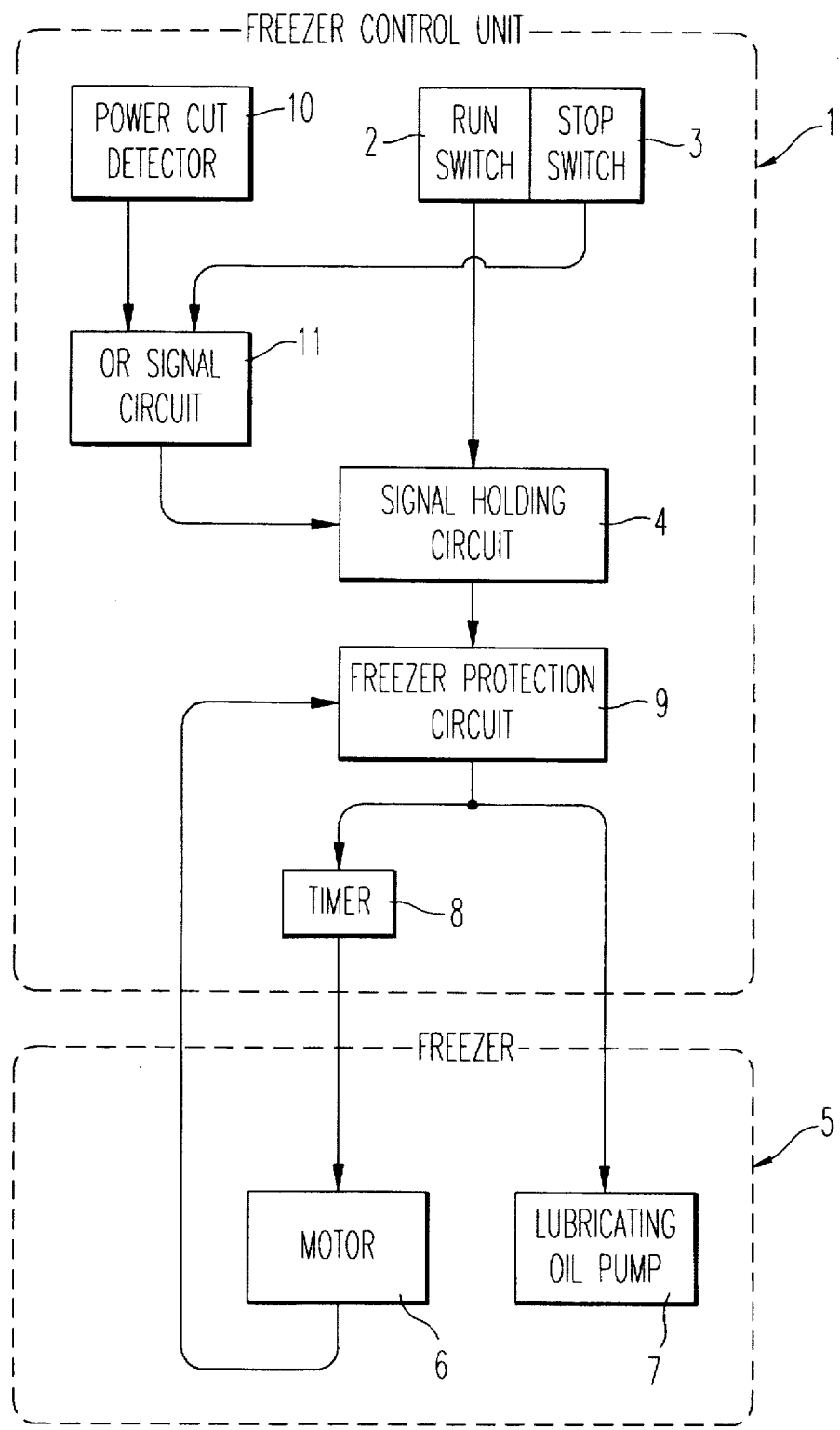
FIG. 1 is a block diagram showing a first actual configuration of the freezer control unit concerned in this invention.
Figure 2A:
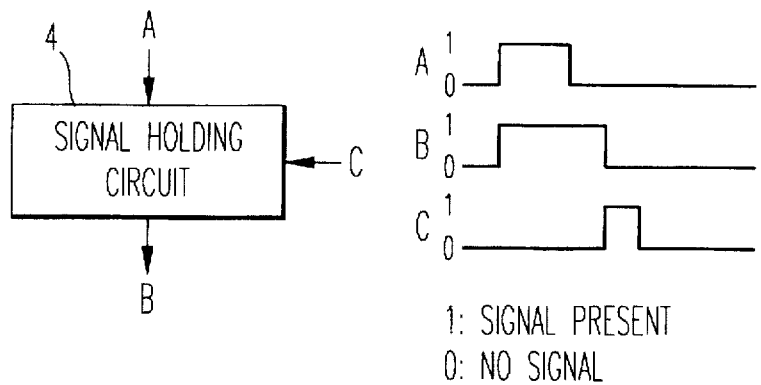
FIG. 2 (A)–(F) are function illustrations showing details of the signal processing of each circuit.
Figure 2B:
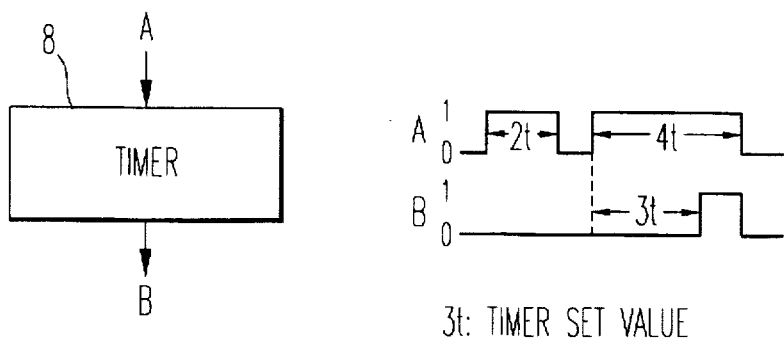
Figure 2C:
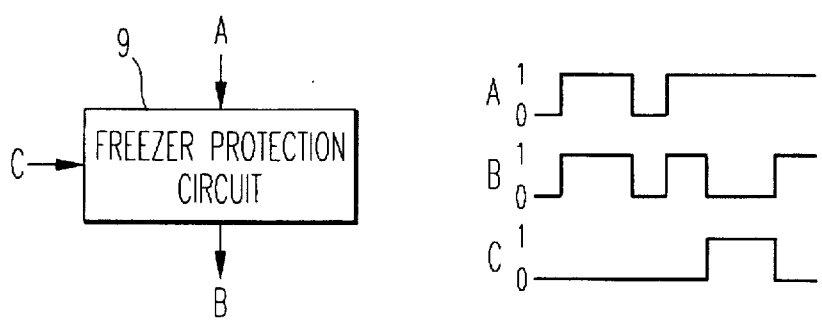
Figure 2D:
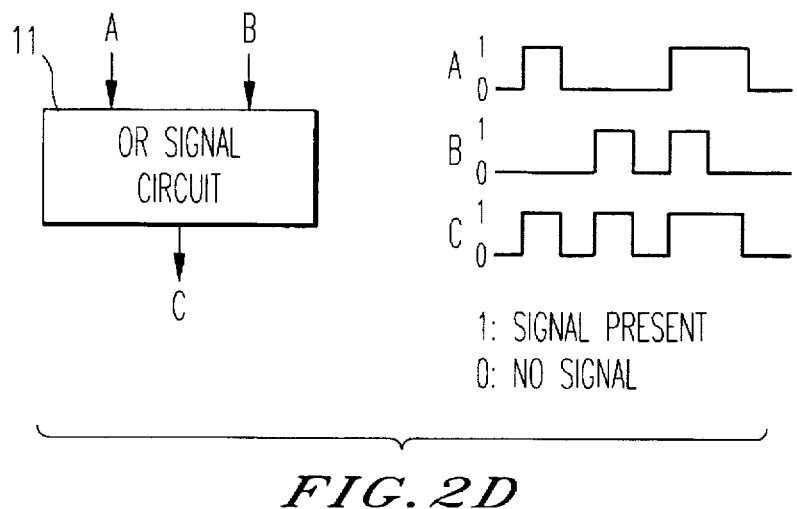
Figure 2E:
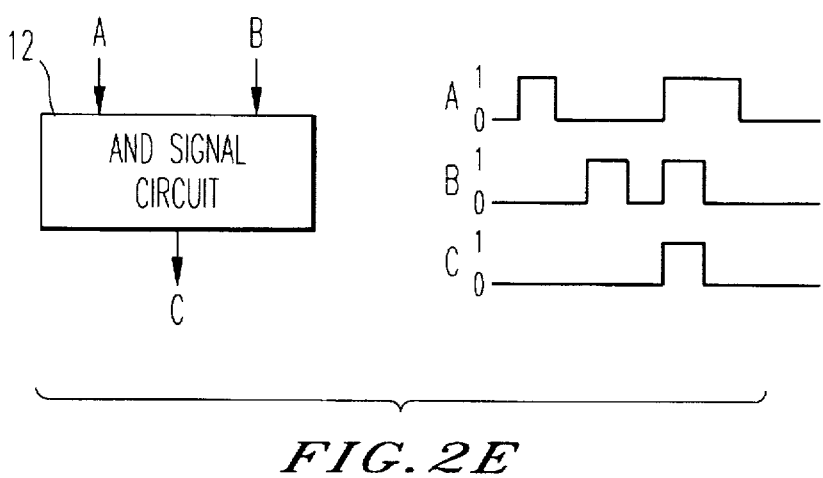
Figure 2F:
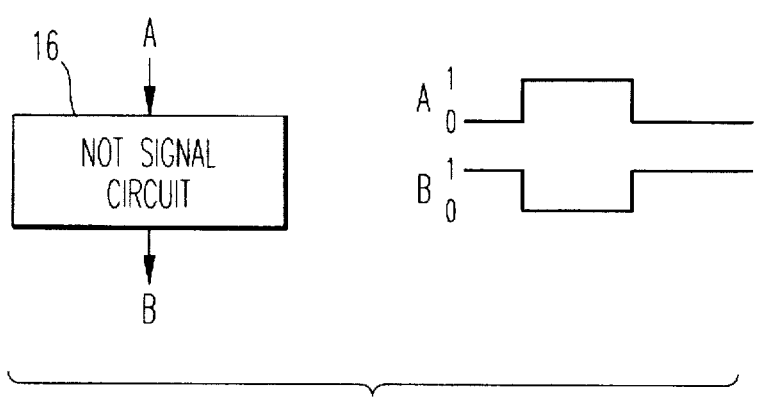

The following are descriptions of actual configurations of this invention based on the drawings. In FIG. 1, the same symbols have been given to the same components as in the above-mentioned prior art.

As shown in FIG. 1, freeze control unit 1 is composed of: run switch 2 and stop switch 3 which control normal running and stopping; signal holding circuit 4 which holds the 'Run' signal of run switch 2; timer 8 which delays the running time of motor 6 until after that of lubricating oil pump 7; freezer protection circuit 9 which cuts the 'Run' signal to motor 6 and lubricating oil pump 7 when freezer 5 has stopped due to a break down; power cut detector 10 which detects the ocrrence of power cuts; OR signal circuit 11 which outputs a signal which stops the 'Run' signal of run switch 2 inputted to signal holding of circuit 4 when one or other of the signal of power cut detector 10 and the 'Stop' signal of stop switch 3 are established.

The details of the signal processing of each of the above circuits are shown in the function illustration of FIG. 2 (A)-(D).

The following is a description of the operation of this a actual configuration.

In control of normal running and stopping, the 'Run' signal of run switch 2 is held in signal holding circuit 4 during running. At the same time, the 'Run' signal is outputted to lubricating oil pump 7 and motor 6 of freezer 5 via freezer protection circuit 9. The 'Run' signal to motor 6 is supplied by delaying it by a specified time by timer 8 after the 'Run' signal to lubricating oil pump 7.

On the other hand, when stopping, the holding of the 'Run' signal is stopped by outputting the 'Stop' signal of stop switch 3 to signal holding circuit 4 via OR signal circuit 11, and the of running of freezer 5 is stopped.

Also if there is a power cut, the power cut is detected by power cut detector 10 and a 'Power Cut' signal is outputted to signal holding circuit 4 via OR signal circuit 11. The holding of the 'Run' signal is stopped to halt the running of freezer 5. For running after restoration of power, a check is made that running does not occur simultaneously with that of other devices which required large amounts of power when restarting. The restart is then executed by operating run switch 2.

Figure 3:
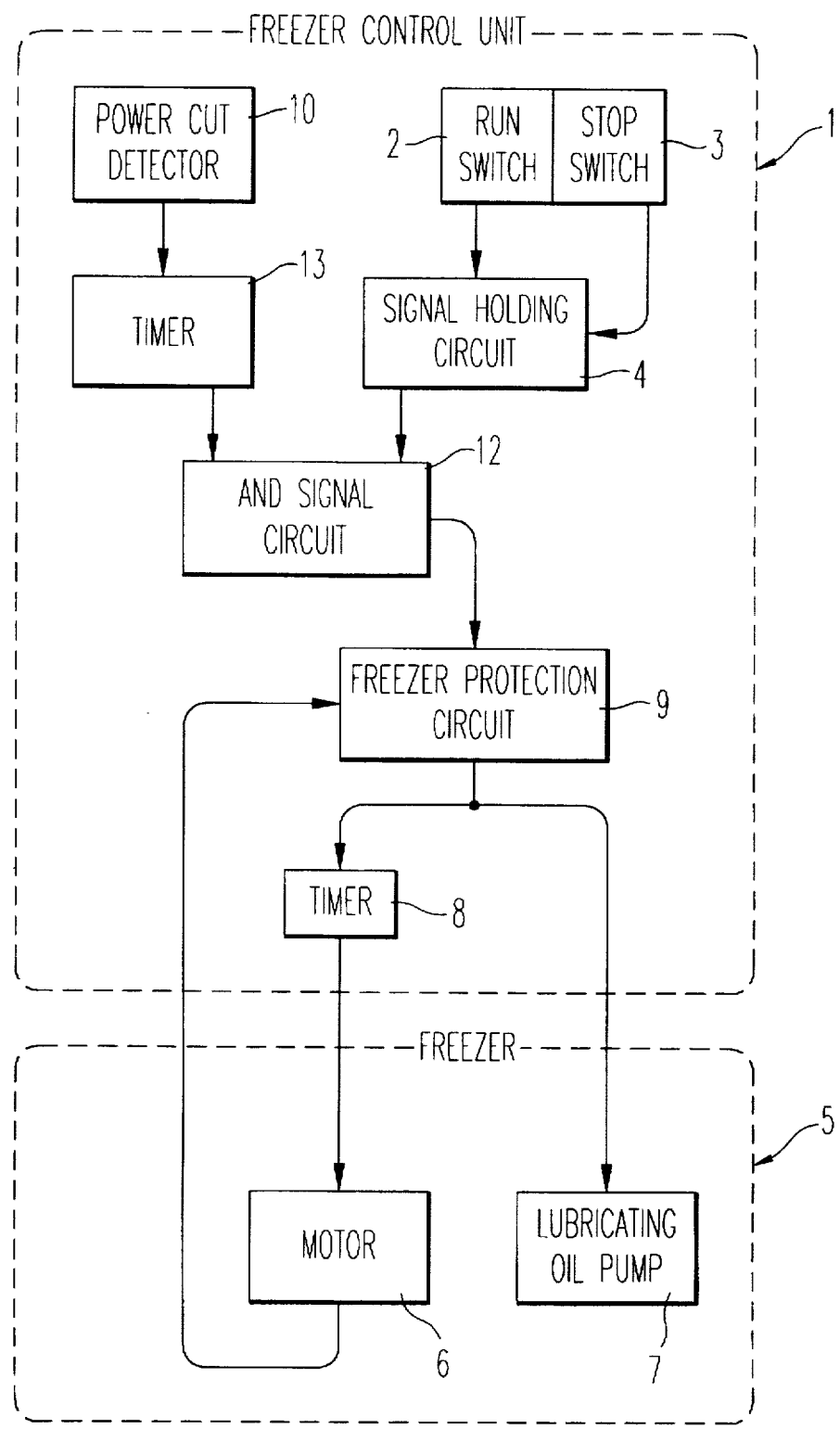
FIG. 3 is a block diagram showing a second actual configuration of the freezer control unit concerned in this invention.

In this way, when using this actual configuration, power cut detector 10 is provided which detects power cuts in the power source system, and the signal of signal holding circuit 4 which outputs the 'Run' signal is stopped by the 'Power Cut' signal of power cut detector 10 when a power cut occurs. In other words, because the 'Run' signal to freezer 5 is automatically canceled by a power cut, automatic restarting on restoration of power can be prevented. Thus, over currents, etc., on the power source system can be prevented. In FIG. 3 that is a block diagram of a second actual configuration of a freezer control unit concerned in this invention, this is described by giving the same symbols to components which are the same as in the above first actual configuration. The same applies to each of the actual configurations which follow.

Freezer control unit I is compose of: run switch 2 and stop switch 3 which control normal running and stopping; signal holding circuit 4 which holds the 'Run' signal of run switch 2; timer 8 which delays the running time of motor 6 until after that of lubricating oil pump 7; freezer protection circuit 9 which cuts the 'Run' signal to motor 6 and lubricating oil pump 7 when freezer 5 has stop by breaking down; power cut detector 10 which detects the occurrence of power cuts; timer 13 which outputs the signal outputted from power cut detector 10 after a specified time has elapsed after the restoration of power; AND signal circuit 12 which outputs a 'Run' signal to freezer protection circuit 9 when both the signal of this timer 13 and the 'Run' signal of run switch 2 are established.

The signal processing details of AND signal circuit 12 are shown in the function illustration of FIG. 2 (E).

The following is a description of the operation of this actual configuration.

In normal running and stopping control, the 'Run' signal of run switch 2 is held by signal holding circuit 4 during running. At the same, the 'Run' signal is outputted to lubricating oil pump 7 and motor 6 of freezer 5 via freezer protection circuit 9 by AND signal circuit 12 judging that no power cut has occurred. The 'Run' signal to motor 6 is delayed by timer 8 for a specified time after that to lubricating oil pump 7.

On the other hand, when stopping, the holding of the 'Run' signal is stopped by outputting the 'Stop' signal of stop switch 3 to signal holding circuit 4, and the running of freezer 5 is stopped.

Also, when there is a power cut, the power cut is detected by power cut detector 10, and the fact that the signal of power cut detector 10 has not been outputted is judged by AND signal circuit 12. Thus, the 'Run' signal to freezer protection circuit 9 is cut off, and the 'Run' signal to freeze 5 is cut off.

Then, when power is restored, although the output signal of power cut detector 10 is outputted, the signal output to AND signal circuit 12 is delayed for a specified time by timer 13. Thus the restarting of freezer 5 is delayed so that, when restarting, its restart will not occur simultaneously with that of other devices which require large amounts of power.

That is to say, with this actual configuration, power cuts and the restoration of the power system are detected by power cut detector 10. The signal of this power cut detector 10 is inputted by timer 13. After restoration of power, a signal which permits running of freezer 5 is outputted by timer 13 after a specified time. Thus, control is exercised so that the restart will not occur simultaneously with that of other devices which required large amounts of power when restarting.

When using this type of actual configuration, at the time of restarting after a power cut, running will not occur simultaneously with that of other devices which require large amounts of power when starting to run. Thus automatic restarting of freezer 5 is made possible and, at the same time, overloding of the power source system can be prevented.

Figure 4:
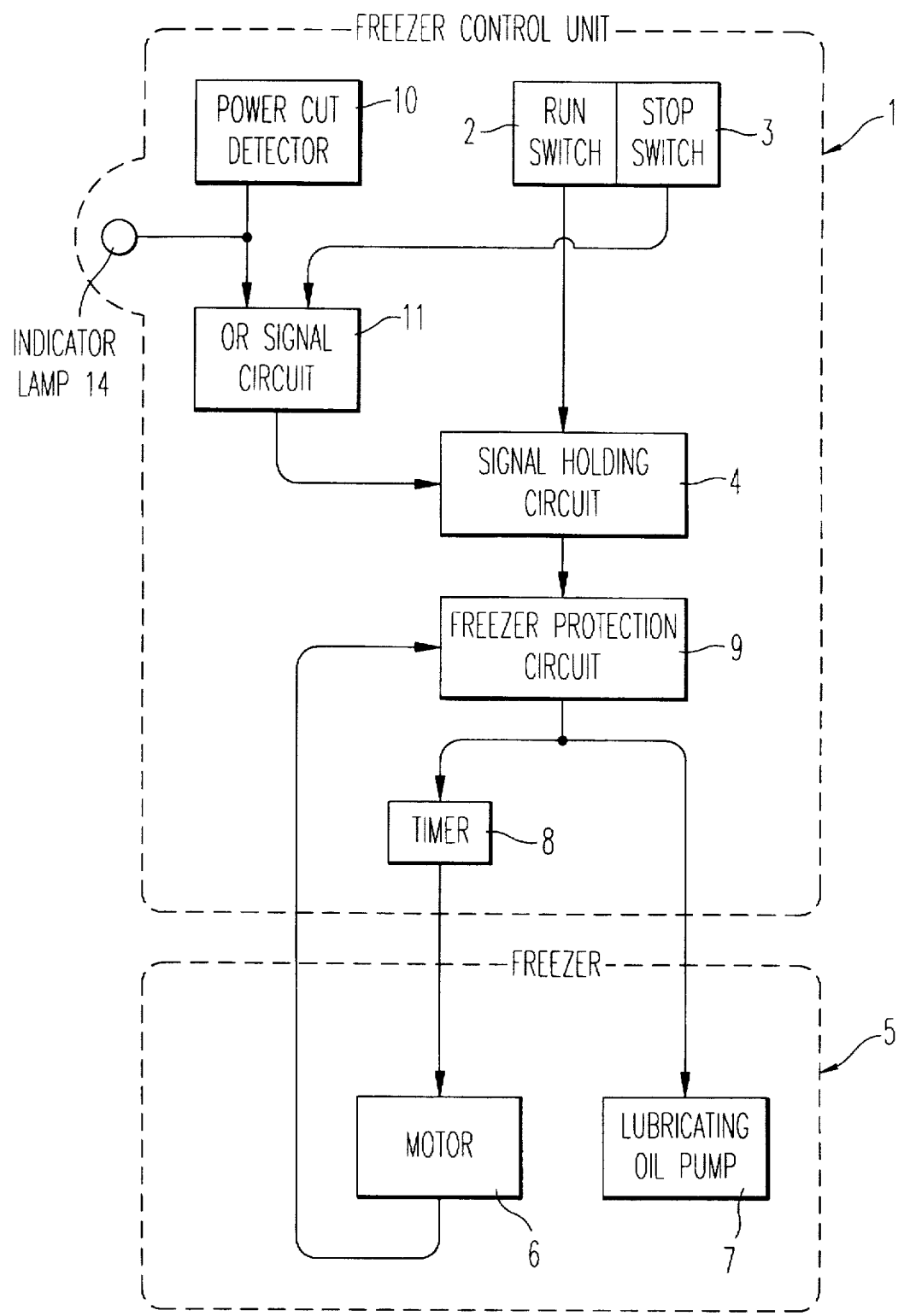
FIG. 4 is a block diagram showing a third actual configuration of the freezer control unit concerned in this invention.

As shown in FIG. 4, in the third actual configuration concerned in this invention, the composition provides indicator lamp 14 which is lit by a signal which is outputted by power cut detector 10 detecting a power cut. The rest of the composition is the same as the composition in the first actual configuration. For this reason, the basic composition and operation are the same as in the first actual configuration, and their descriptions have been omitted.

As the operation with the above composition, the signal holding of the 'Run' instruction to freezer 5 is automatically canceled, that is to say stopped, by the occurrence of a power cut being detected by power cut detector 10. The occurrence of this power cut and the fact that the 'Run' signal of freezer 5 has been stopped by the power cut are indicated by indicator lamp 14.

When using this type of actual configuration, the operator can judge the occurrence of a power cut and the fact that the 'Run' instruction to freezer 5 has been stopped by seeing the lighting of indicator lamp 14. Therefore, the reactivation of freezer 5 after the restoration of power can be simply performed.

By providing indicator lamp 14 easily visible to the operator, and by providing such lamps in multiple locations, the operator can not fail to notice the lit up lamps and will be able to react accordingly, therefore further improving the above effect.

Figure 5:
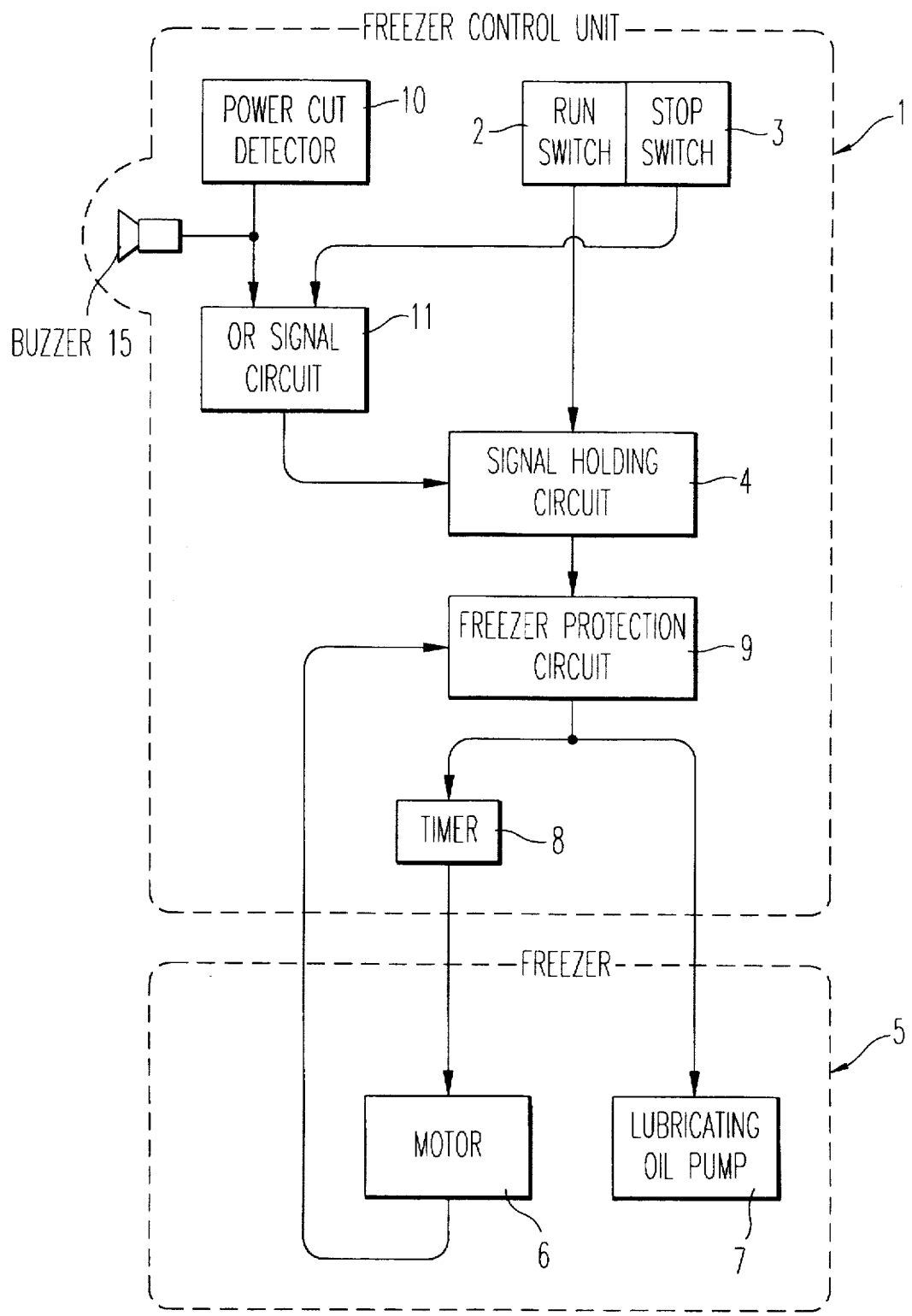
FIG. 5 is a block diagram showing a fourth actual configuration of the freezer control unit concerned in this invention.

As shown in FIG. 5, in the fourth actual configuration concerned in this invention, the composition provides buzzer 15 which emits a warning by a signal which is outputted by power cut detector 10 when having detected a power cut. The rest of the composition is the same as the composition in the first actual configuration. For this reason, the basic composition and operation are the same as in the first actual configuration, and their descriptions have been omitted.

As with the operation of the above composition, the signal holding of the 'Run' instruction to freezer 5 is automatically canceled, that is to say stopped, by the occurrence of a power cut being detected by power cut detector 10. Warning of the occurrence of this power cut and the fact that the 'Run' signal of freezer 5 has been stopped by the power cut are given by buzzer 15.

When using this type of actual configuration, the operator can judge the occurrence of a power cut and the fact that the 'Run' instruction to freezer 5 has been stopped by hearing buzzer 15. Therefore, running operation of freezer 5 after the restoration of power can be simply performed.

The warning by buzzer 15 has the advantage that, even if the operator is employed on other duties, he will be made aware of it as it is transmitted by sound. Also, it is easy to give simultaneous warning to many other persons concerned. By providing buzzer 15 in a location where the operator can easily be aware of it, the above effect is further improved.

Figure 6:
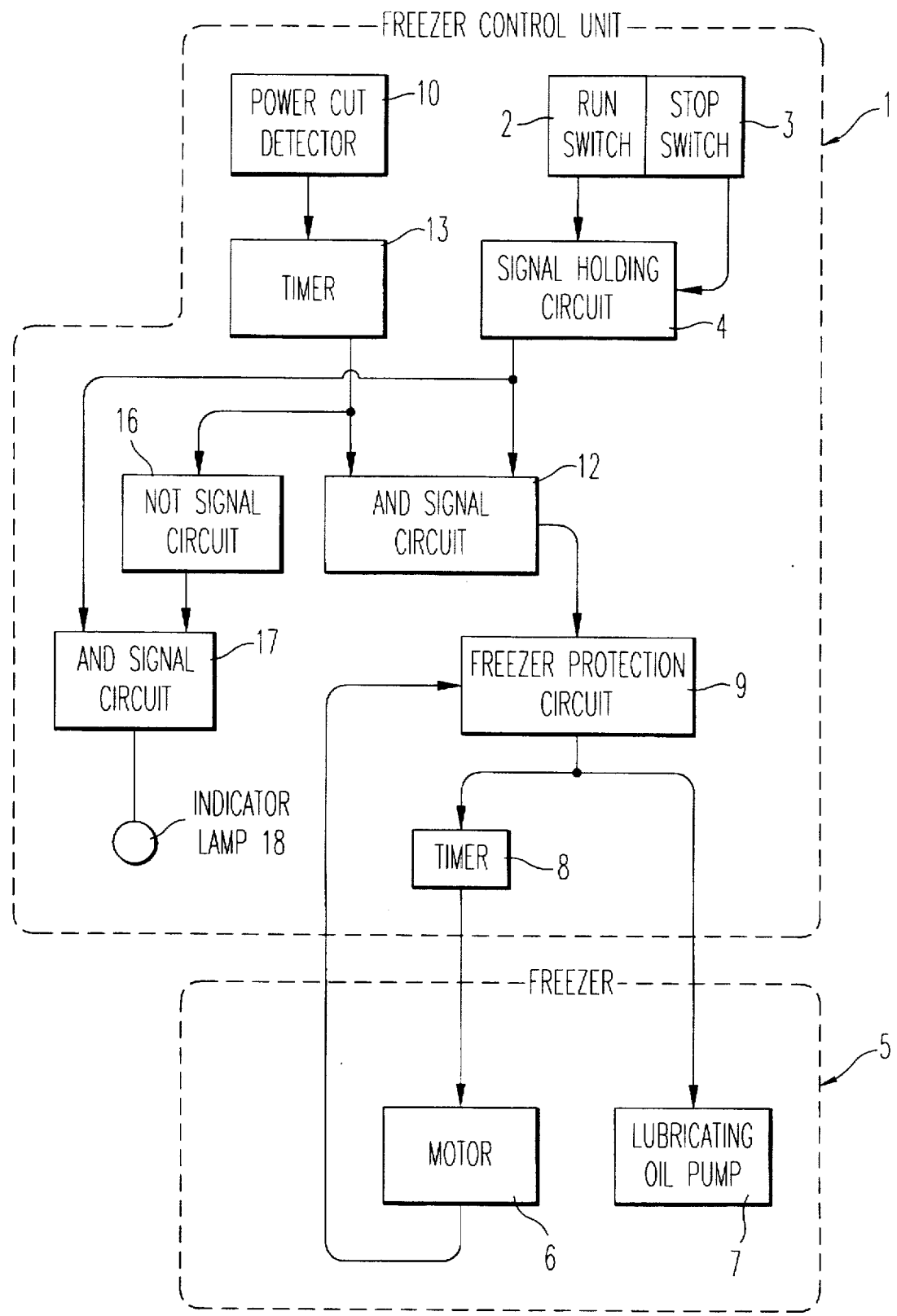
FIG. 6 is a block diagram showing a fifth actual configuration of the freeze control unit concerned in this invention.
Figure 7:
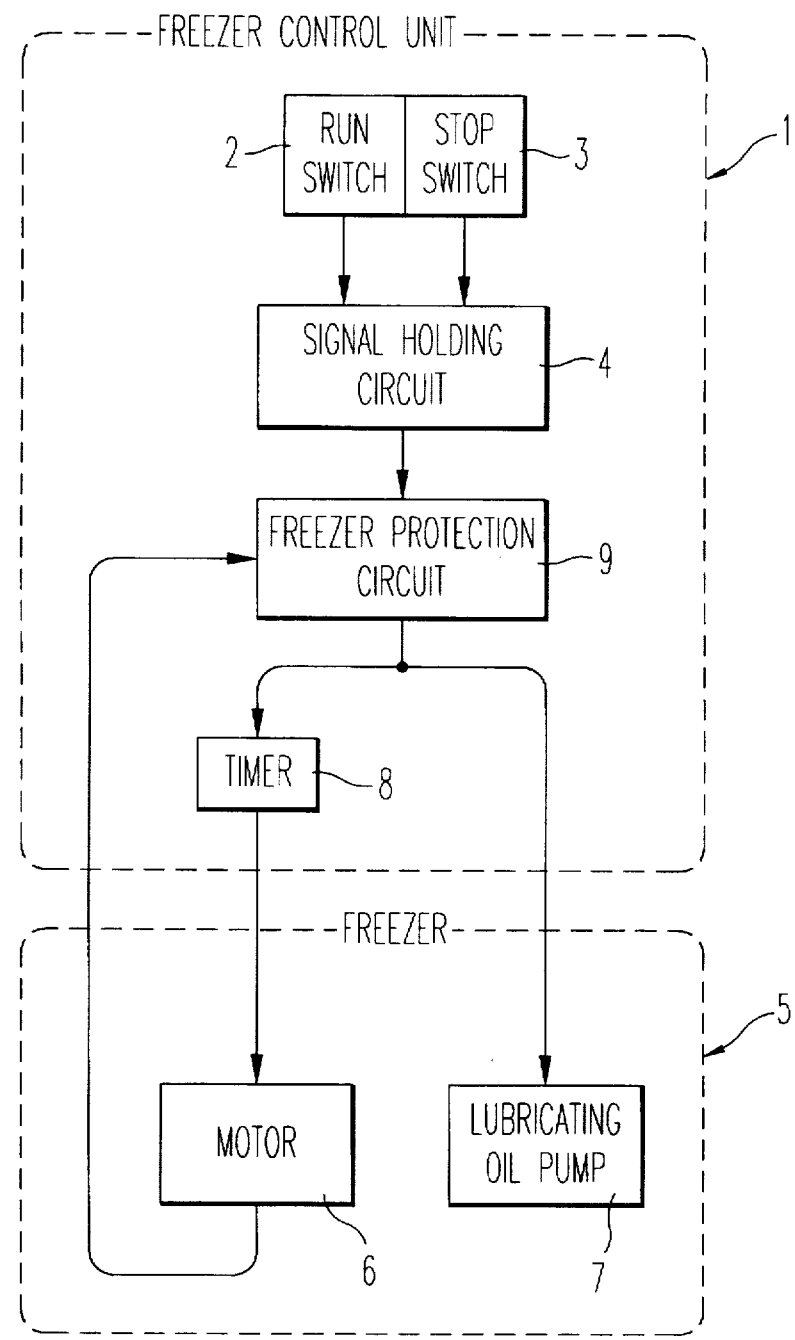
FIG. 7 is a block diagram showing a prior art freezer control unit.
Figure 8A:
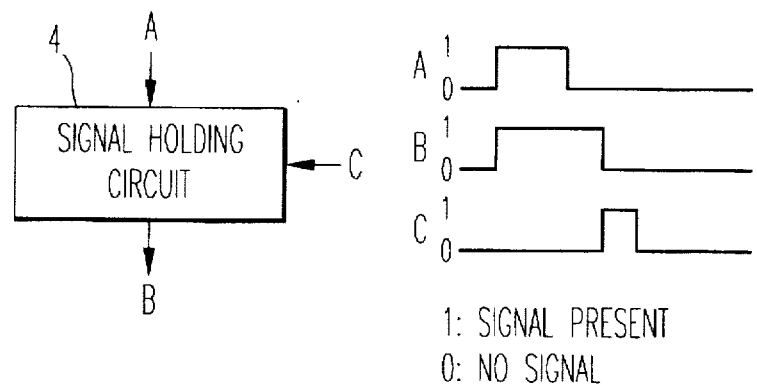
FIG. 8 (A)–(C) are function illustrations showing details of the signal processing in the circuits in FIG. 7
Figure 8B:
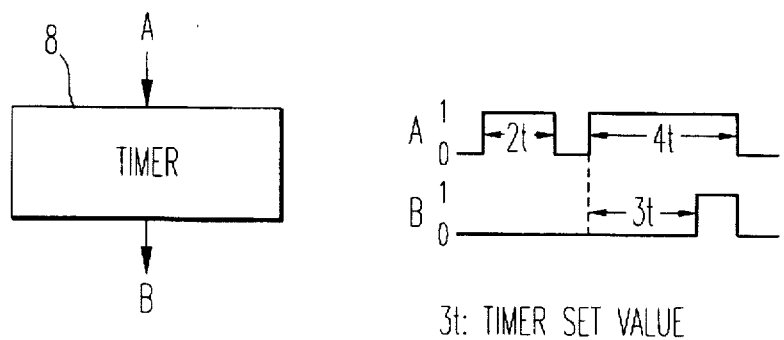
Figure 8C:
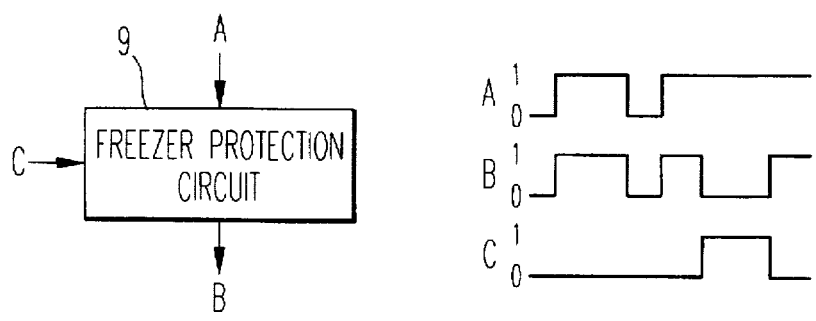

FIG. 6 is a block diagram showing a fifth actual configuration of a freezer control unit concerned in this inaction. As shown in FIG. 6, in addition to the composition of the second actual configuration shown in FIG. 3, the fifth actual configuration provides: NOT signal circuit 16 which outputs a signal which negates the output signal of timer 13; AND signal circuit 17 which outputs a signal when both the output signal of NOT signal circuit 16 and the output signal of signal holding circuit 4 are established; and indicator lamp 18 which is lit by the output signal of AND signal circuit 17. For this reason, the basic composition and operation are the same as in the second actual configuration, and their descriptions are omitted.

The detail of the signal processing of NOT signal circuit 16 is shown in the function illustration of FIG. 2 (F).

When using the above composition, during the specified time that the restarting of freezer 5 after restoration of power is delayed by timer 13, the output signal of timer 13 will not be outputted, but the 'Run' signal of freezer 5 will be outputted from signal holding circuit 4. Indicator lamp 18 is lit by monitoring the fact that the condition of both these two signals is established by NOT signal circuit 16 and AND signal circuit 17.

That is to say, with this actual configuration, in the restarting of freezer 5 on the restoration of power following a power cut, during the specified time of timer 13 which delays the running time of freezer 5, the fact that the restart is in the waiting mode is indicated by indicator lamp 18.

When using this actual configuration in this way, by seeing the lighting of indicator lamp 18, the operator can judge that freezer 5 is in the waiting period for restart, and can easily see the state of freezer 5 following the restoration of power.

By providing indicator lamp 18 where the operator can easily see it, and by providing such lamps in multiple locations, the operator can not fail to notice the lit up lamps, further improving the above effect.

When using the first invention as described above, a power cut detector is provided which detects power cuts in the power source system, and the signal of the signal holding circuit which outputs the 'Run' signal is stopped by the 'Power Cut' signal of the power cut detector when a power cut occurs. Therefore, running of the freezer, which requires a large amount of power when starting to run, and even running when power is restored, can be controlled so that it does not run simultaneously with other devices which require large amounts of power when starting to run. Thus, the effect on over-currents or voltage reductions in the power source system can be prevented.

Also, by providing an indicator lamp which is lit or a buzzer which sounds a warning when the power cut detector operates, the operator can judge by being aware of the lighting of the indicator lamp or the buzzer warning that a power cut has occurred and the 'Run' instruction to the freezer has been stopped. Therefore, the running operation of the freezer after power restoration can be easily performed.

When using the second invention, power cuts and power restorations of the power source system are detected by the power cut detector. The signal of this power cut detector is inputted in a second timer. After power restoration, a signal which permits running of the freezer is outputted by this timer after a specified time. Thus, control is exercised so that running does not occur simultaneously with other devices which require large amounts of power when starting up. Therefore, automatic restarting of the freezer becomes possible and, as a result, its effect on the power source system can be prevented.

Also, during the specified period of the timer which delays the running time of the freezer on the restarting of the freezer on power restoration after the occurrence of a power cut, the fact that the freezer is in a state of awaiting restarting is indicated by an indicator lamp. By this means, the operator can judge by seeing the lighting of the indicator lamp that the freezer is in the waiting process for restarting, and can easily see the running state of the freezer after the restoration of power.

What is claim is:

1. In a freezer control unit provided with a run switch and a stop switch which operate running and stopping of the freezer;

a signal holding circuit which holds the 'Run' signal of this run switch;

a timer which receives the 'Run' signal held by this signal holding circuit and starts the freezer drive motor by delaying it for a specified time after the freezer lubricating oil pump; and a freezer protection circuit which cuts the 'Run' signal, which is the output of the said signal holding circuit, when the freezer has broken down, a freezer control unit which has the characteristic of being provided with a power cut detector which detects cuts in the power source of the said freezer; and an OR signal circuit which outputs a signal which stops the 'Run' signal of the said signal holding circuit when at least one of this power cut detection signal and the stop signal of the said stop switch is established.

2. In the freezer control unit according to claim 1, wherein a freezer control unit which has the characteristic of providing an indicator lamp which lights when the power cut detector has operated.

3. In the freezer control unit according to claim 1, wherein a freezer control unit which has the characteristic of providing a buzzer which emits a warning when the power cut detector has operated.

4. In a freezer control unit provided with a run switch and a stop switch which operate running and stopping of the freezer;

a signal holding circuit which holds the 'Run' signal of this run switch;

a timer which receives the 'Run' signal held by this signal holding circuit and starts the freezer drive motor by delaying it for a specified time after the freezer lubricating oil pump; and a freezer protection circuit which cuts the 'Run' signal, which is the output of the said signal holding circuit, when the freezer has broken down, a freezer control unit which has the characteristic of being provided with a power cut detector which detects cuts in the power source of the said freezer;

another timer which receives the output signal of this power cut detector and outputs a signal which permits rerunning of the said freezer a specified time after the power has been restored; and an AND signal circuit which outputs a 'Run' signal to the said freezer when both the output signal of this timer and the output signal of the said signal holding circuit have been established.

5. In the freezer control unit according to claim 4, wherein a freezer control unit which has the characteristic of being provided with a NOT signal circuit which negates the output signal of the other timer;

another AND circuit which detects that both the output signal of this NOT signal circuit and the output signal of the said signal holding circuit have been established; and an indicator lamp which is lit by the output signal of this AND signal circuit, and indicates by this indicator lamp the fact that the freezer is awaiting restart after the restoration of power.

* * * * *